United States Patent [19]
Schroeder et al.

[11] Patent Number: 5,542,036
[45] Date of Patent: Jul. 30, 1996

[54] IMPLICIT MODELING OF SWEPT VOLUMES AND SWEPT SURFACES

[75] Inventors: William J. Schroeder, Schenectady; William E. Lorensen, Ballston Lake, both of N.Y.; Steven E. Linthicum, Fairfield, Ohio

[73] Assignee: General Electric Company, Schenectady, N.Y.

[21] Appl. No.: 270,882

[22] Filed: Jul. 5, 1994

[51] Int. Cl.$^6$ .................................................. G06T 17/50
[52] U.S. Cl. ........................................................ 395/124
[58] Field of Search ..................................... 395/118, 119, 395/123, 124, 86, 87, 97

[56] References Cited

U.S. PATENT DOCUMENTS 4,987,554  1/1991  Kaufman ................................. 395/124

OTHER PUBLICATIONS (Publication) Weld and Leu "Geometric Representation of Swept Volumes with Application to Polyhedral Objects" Int'l Jour. of Robotics Research, 9(5):105–117 Oct. 1990.
(Publication) Martin and Stephenson [12] "Sweeping of Three–Dimensional Objects" Computer Assisted Design 22(4):223–234, May 1990.
(Publication) Wang and Wang [6] "Geometric Modeling for Swept Volume of Moving Solids" IEEE Computer Graphics and Applications 6(12):8–17 1986.
(Publication) Bloomenthal [15] "Polygonization of Implicit Surfaces" Computer Aided Geometric Design, 5(4):341–355, Nov. 1988.

Primary Examiner—Mark K. Zimmerman
Assistant Examiner—Cliff N. Vo
Attorney, Agent, or Firm—Lawrence P. Zale; Marvin Snyder

[57] ABSTRACT

A method of determining surfaces of swept volumes, which defines a region reserved for the removal of an object, or the motion of an object, is determined employing implicit modeling. A definition of an object and the trajectory in which it is to be moved are provided to the swept surface display device. An implicit model is created by determining shortest distance from each voxel of a object volume to a surface point of the object. A workspace volume has voxels each initialized with distances which are much larger than any distance envisioned. The implicit model space voxels are transformed relative to the workspace voxels according to the trajectory at a time t. Workspace voxels are updated with corresponding implicit model space voxels when the value of the implicit model space voxel is lower than the workspace voxel value. The implicit model space voxels are transformed relative to the workspace voxels for another time t and the number of workspace voxels are again updated. This process is repeated for a number of times, t, to result in workspace voxel values which reflect the closest each voxel would be to the surface of the object as it is swept through the trajectory. All workspace voxels having a predefined distance value are identified and a surface is constructed. This is the surface of the swept volume having a clearance defined by the predefined distance.

4 Claims, 9 Drawing Sheets

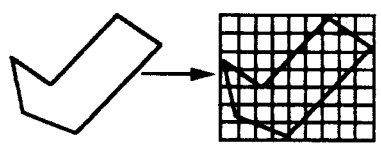
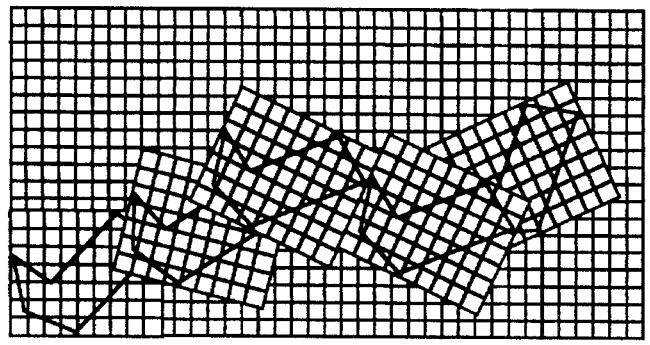
Figure 1a
Figure 1b
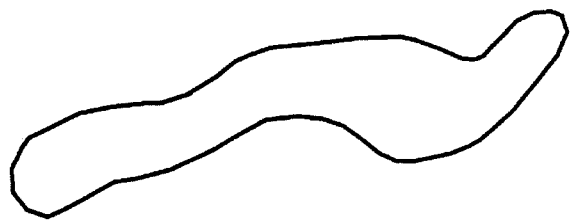
Figure 1c
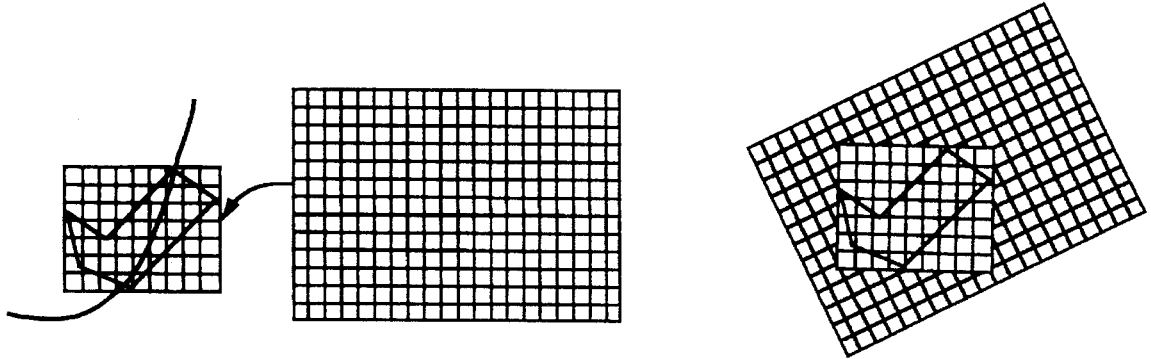
Figure 3a
Figure 3b

IMPLICIT MODELING OF SWEPT VOLUMES AND SWEPT SURFACES

BACKGROUND OF THE INVENTION

1. Field of the Invention

This invention relates to a system for computer aided design and more specifically for displaying surfaces of volumes in computer models which is required to be left unobstructed.

2. Description of Related Art

A swept volume is the space occupied by a geometric model as it travels along an arbitrary trajectory. A swept surface is the boundary of the volume. Swept surfaces and volumes play important roles in many computer-aided design applications including geometric modeling, numerical control cutter path generation, and spatial path planning.

In geometric modeling swept curves and surfaces are used to represent extrusion surfaces and surfaces of revolution. More complex geometry can be generated by using higher order sweep trajectories and generating surfaces. In robot motion planning, the swept volume can be used to evaluate paths which would not interfere with the motion of a robot. Numerical control path planning also uses swept volumes to show the removal of material by a tool.

Swept surfaces and volumes can also be applied to resolve maintainability issues that arise during the design of complex mechanical systems. The designer needs to be able to create and visualize the accessibility and removeability of individual components of the system. Typical questions related to maintainability include:

Can a mechanic remove the spark plugs?

Is there room for an improved power supply?

What is the impact on the maintenance of a system if new components are included?

In maintenance design, the swept surface of the part to be removed is called the removal envelope. The removal envelope is the surface that a component generates as it moves along a safe and feasible removal trajectory. A safe trajectory is one that a component can follow without touching other components of the system. A feasible trajectory is one that can be performed by a human.

Path Planning

Weld and Leu in "Geometric Representation of Swept Volumes with Application to Polyhedral Objects" *Int'l Jour. of Robotics Research*, 9(5):105–117 Oct. 1990, presented a topological treatment of swept volumes. They showed that the representation of a swept volume in n-dimensional space, $R^n$, generated from a n-dimensional object is reduced to developing a geometric representation for the swept volume from its (n-1) boundary. However, they point out that the boundary and interior of the swept volume are not necessarily the union of the boundary and interior of the (n-1) boundary. That is, there may exist points on the boundary of the swept volume that are interior points of the (n-1) boundary of the swept volume. Likewise, boundary points of the object may contribute to the interior of the swept volume. This unfortunate property of swept volumes limits conventional precise geometric modeling to restricted cases.

Martin and Stephenson in "Sweeping of Three-Dimensional Objects" *Computer Assisted Design* 22(4):223–234, May 1990, recognize the importance of implicit surface models for envelope representation, but tried to provide a closed solution. They presented a theoretical basis for computing swept volumes, but note that complicated sweeps may take an unrealistic amount of computer time.

Wang and Wang in "Geometric Modeling for Swept Volume of Moving Solids" IEEE *Computer Graphics and Applications* 6(12):8–17 1986, presented a numerical solution that uses a 3D z-buffer to compute a family of critical curves from a moving solid. They restricted the generating geometry to a convex set, an appropriate restriction for their numerical control application.

Implicit Modeling

An implicit model specifies a scalar field value at each point in space. A variety of field functions are available depending on the application. The variation of the fields is typically a cubic polynomial. Usually these fields are represented on a regular sampling (i.e., volume) as described by Bloomenthal in "Polygonization of Implicit Surfaces" *Computer Aided Geometric Design*, 5(4):341–355, Nov. 1988. Surface models are extracted from volume data using an iso-surface techniques. If the field values are distance functions to the closest point on the model, offset surfaces can be created by choosing a non-zero iso-surface value.

OBJECTS OF THE INVENTION

Accordingly, an object of the present invention is to provide a computer aided design system for displaying surfaces of volumes which are to remain unobstructed.

Another object of the present invention is to provide a computer aided design system to illustrate surfaces of a volume in which moving parts operate.

SUMMARY OF THE INVENTION

A computer aided design system according to the present invention displays surfaces of three-dimensional (3D) volumes which are to remain unobstructed to insure access to parts of a constricted machine, allow maintenance, or allow removal and installation of parts rapidly in a constricted region.

Swept surfaces and volumes are generated by moving a geometric model through space. Swept surfaces and volumes are important in many computer-aided design applications including geometric modeling, numerical cutter path generation, and spatial path planning. A system for generating swept surfaces and volumes employs implicit modeling techniques. The present invention is applicable to any geometric representation for which a distance function can be computed. The present invention may be employed in robot path planning in addition to maintainability design.

BRIEF DESCRIPTION OF THE DRAWINGS

The features of the invention believed to be novel are set forth with particularity in the appended claims. The invention itself, however, both as to organization and method of operation, together with further objects and advantages thereof, may best be understood by reference to the following description taken in conjunction with the accompanying drawing(s) in which:

FIGS. 1a, 1b, 1c together illustrate the general steps of swept surface generation.

FIG. 3 illustrates inverse transformation of workspace voxels relative to implicit model space voxels.

DETAILED DESCRIPTION OF THE INVENTION

Figure 2:
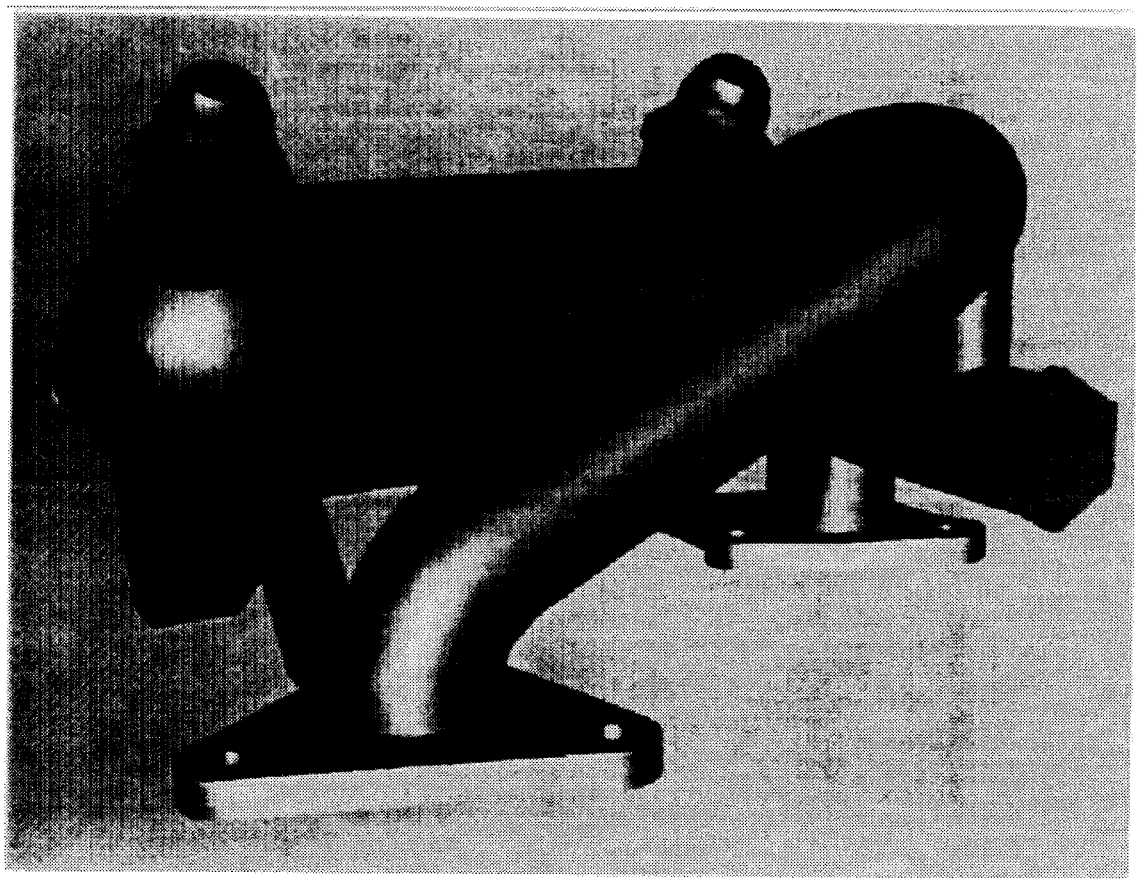
FIG. 2 illustrates an fuel/oil heat exchanger to be swept through a sweep trajectory.

The present invention is a system for displaying surfaces of volumes required to remain unobstructed. The technique of the present invention assumes that a safe and feasible trajectory is already available. Computer-assisted trajectory generation using commercial computer-aided design or robot simulation software was employed in the present invention.

In the present invention, a geometric model and a trajectory defined by a sequence of continuous transformations, is acquired. A volume occupied by the model as it travels along the trajectory is computed. A surface of this volume, is known as a swept surface. The surface may be generated by any known surface generator such as that described in U.S. Pat. No. 4,710,876, "System and Method for the Display of Surface Structures Contained Within the Interior Region of a Solid Body" by Harvey E. Cline and William E. Lorensen issued Dec. 1, 1987, assigned to the present assignee and hereby incorporated by reference, "Marching Cubes". Generally, three functions are performed as follows.

1. In FIG. 1a, an implicit model is generated from the original geometric model. A distance value being a minimum distance from a given voxel to the surface of the object. The object may be of any representational form, such as a geometric model, as long as a distance function can be computed for any point. Common representations include polygonal meshes, parametric surfaces, constructive solid models, or implicit functions.

2. In FIG. 1b, the implicit model is swept according to a sweep trajectory ST(t) through a workspace volume $V_W$. The workspace volume is constructed to contain the model as it travels along the sweep trajectory ST(t). The sweeping is performed by transforming the implicit model according to the sweep trajectory ST(t) at a selected time instant t, and repeatedly identifying workspace volume $V_W$ voxels which intersect implicit model voxels and replacing the distances of the workspace voxels with implicit model distances when the implicit model distances are smaller. This is known as sampling, The implicit model is then transformed to a new sweep trajectory location for a new time instant, t. This is repeated along the sweep trajectory ST(t). The end result are minimum distance values at each workspace volume $V_W$ voxel.

3. In FIG. 1c, a swept surface is generated from the workspace volume distances using a iso-surface extraction algorithm such as the 'marching cubes' algorithm mentioned above. The value d of the iso-surface is a distance measure. If a surface is selected identifying all workspace voxels with d=0, the surface is the swept surface identifying the minimum space required to be reserved without any clearance. By defining a surface having a value being d, a small predetermined distance, a volume is defined which is d larger than the swept surface to allow for some clearance.

A detailed examination of each of these steps follows:

Generating the Implicit Model

In generating an Implicit Model, an object, such as a geometric model, is provided and converted into a number of distance values, each corresponding to a voxel of the implicit model volume, $V_I$. The distance is a scalar value representing a minimum distance from the voxel to the nearest point on the surface of the model. In a 3D volume, $V_I$ would have dimensions ($n_1$, $n_2$, $n_3$).

Bloomenthal, referenced above, described developing an Implicit Model. Any n-dimensional object in $R^n$ (assume here n=3) can be described by an implicit function f(p)=0 where the function f() defines the distances of points p∈$R^3$ to their closest point on the surface of the object. To develop the implicit model the function f() is computed in a 3D volume of dimension ($n_1$, $n_2$, $n_3$). For geometric models having a closed boundary (i.e., having an inside and an outside), f() can generate a signed distance; that is, negative distance values are inside the model and positive values are outside of the model.

Geometric representations often consist of combinations of geometric primitives, such as polygons or splines. In these cases f() must be computed as the minimum distance value as follows. Given the n primitives, the n distance values ($d_1$, $d_2$, . . . , $d_n$) are defined at point p to each primitive, and a minimum value is chosen, $$d=f(p)= \operatorname{Min}\{|d_1|, |d_2|, |d_3|, \ldots, |d_n|,\}.$$

One common representation of an object is the polygonal mesh. Then f(p) is the minimum of the distances from point p to each polygon. For more complex geometry whose distance function may be expensive or too complex to compute, the model can be sampled at many points, and then the points can be used to generate the distance function.

An implicit model is created from an object shown in FIG. 2. FIG. 2 was defined as a mesh consisting of 5,576 polygons. The implicit model volume $V_I$ has a sampling resolution of $100^3$.

Computing the Workspace Volume

The workspace volume $V_W$ voxel values are generated by sweeping the implicit model along the sweep trajectory ST(t), and sampling the transformed implicit model at discrete time instants t. $V_W$ must be sized so that the object is bounded throughout the entire sweep. One simple technique to size $V_W$ is to sweep the bounding box of the geometric model along the sweep trajectory and then compute a global bounding box.

The sweep trajectory ST(t) is generally specified as a series of n transformations, T, such as ST(t)={$T_1, T_2, \ldots, T_n$}. Arbitrary transformations are possible, but most applications define transformations consisting of rigid body translations and rotations. Typically the independent variable is time, t, but may other independent variables may be used.

The implicit model travels along the sweep trajectory in a series of steps, the size of the step dictated by the allowable error. Since these transformations {$T_1, T_2, \ldots, T_n$} may be widely separated, interpolation is often required for an intermediate transformation. These require interpolation.

The sampling of the implicit model is depicted in FIGS. 3a and 3b. The values in $V_W$ are initialized to a large positive value. Then for each sampling step, each voxel location in $V_W$ is inverse transformed into the implicit model space coordinate system of $V_I$. The location of a corresponding voxel within $V_I$ is found and then its distance value is interpolated using tri-linear interpolation. As in the implicit model, the value of the workspace voxel in $V_W$ is assigned the lower of the interpolated value of its original value being a minimum distance. The result is the minimum distance value being assigned to each voxel in $V_W$ seen throughout the sweep trajectory.

Figure 4:
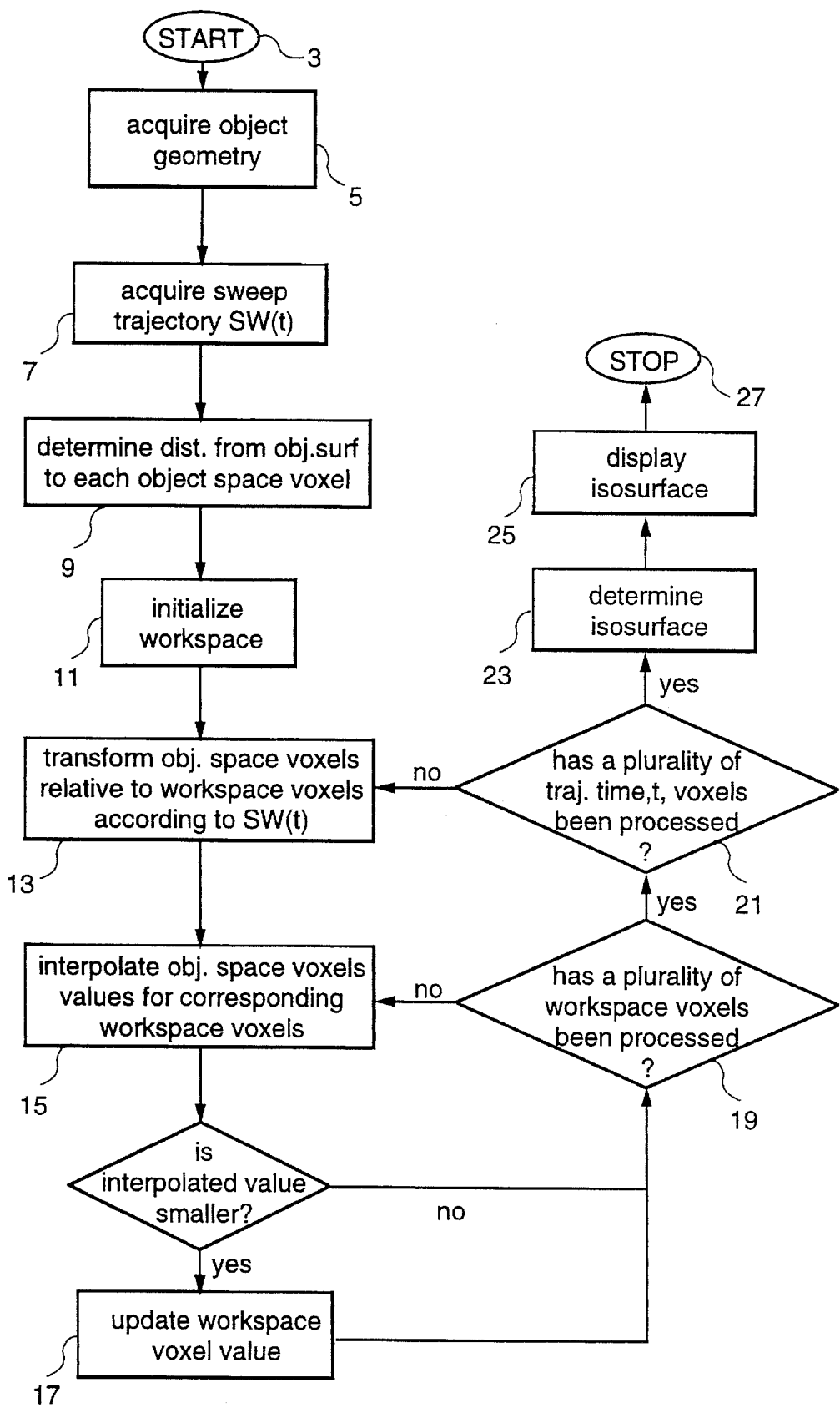
FIG. 4 is a simplified flow chart illustrating a method of generating swept surfaces according to the present invention.

One method of workspace volume $V_W$ distance generation calculates the distance function f() directly from the transformed object, as shown in FIGS. 1a, 1b, 1c and 5, eliminating the need for $V_I$ entirely. Although this can be efficient when the distances f() are not computationally burdensome, it appears that with current methods this method is not preferred. The method of FIG. 3a, 3b, 4 is preferred. In FIG. 3a, an implicit model is produced, and $V_W$ is transformed according to the sweep trajectory ST(t) for time instant t. Workspace voxels which overlap object space voxels are identified and sampled into the transformed workspace volume $V_W$ in FIG. 3b. This improves the performance of the algorithm significantly, since the sampling is independent of the number of geometric primitives in the original model, and the computation required for tri-linear interpolation is typically much less than the computation required for evaluating the distances f() for the implicit model.

Extracting Swept Surfaces

The last step of both above-mentioned embodiments of the invention generates the swept surface from the workspace volume. Since $V_W$ represents a 3D sampling of distance function, the iso-surface algorithm "marching cubes" is used to extract the swept surface. Choosing d=0 generates the surface of the swept volume, while d≠0 generates offset surfaces. In many applications choosing d>0 is desirable to generate surfaces offset from the swept volume by a certain tolerance.

FIG. 4 illustrates a simplified flow chart showing the operation of the present invention. In block 3, the process starts. In block 5, the definition of an object to be modeled and its geometry are acquired from an external device. In block 7, a trajectory is also provided as input. The trajectory defines the movement of the object through space over time. In block 9, an implicit model is created by determining the distance from the object surface to each of the implicit model space voxels, thereby resulting in an N-dimensional block of data referred to as an implicit model. For the remainder of this discussion N-dimensional will be replaced by 3-dimensional but it should be noted that this applies equally to other dimensions.

In step 11, a workspace is created having regularly spaced voxels according to a workspace coordinate system. These voxels are assigned a distance value. Initially, they are assigned a very large number, larger than would be encountered during the processing of typical data. The large predetermined number typically would be a number several of orders of magnitude larger than what would be expected during normal processing.

In step 13, the workspace voxels are translated and rotated according to the trajectory information for a chosen time, t. This would be analogous also to an inverse transformation of the implicit model space voxels. In either case, the relative positioning of the implicit model space voxels and the workspace voxels would be the same. In blocks 15 and 17, a workspace voxel is selected and a corresponding implicit model space voxel is determined. The voxel value for the implicit model space voxel is interpolated in three-dimensions to result in an interpolated voxel value. If the interpolated voxel value is a value lower than that currently assigned to the workspace voxel, the current workspace voxel is replaced with the interpolated value. In block 19, blocks 15 and 17 are repeated for a plurality of workspace voxels. In block 21, blocks 13, 15, 17 and 19 are repeated for a plurality of different sample times, t. This results in a minimum distance being assigned to the workspace voxels from the surface of the object as it is translated and rotated through the defined trajectory over time. In block 23, an iso-surface, being a surface having either the same, or a small range of values is determined throughout the workspace volume. The method of choice would be the above-mentioned "Marching Cubes" method. In block 25, the iso-surface is displayed in a format desirable to the operator. Any number of conventional methods of surface display and color coding may be employed. The process ends at block 27.

Figure 5:
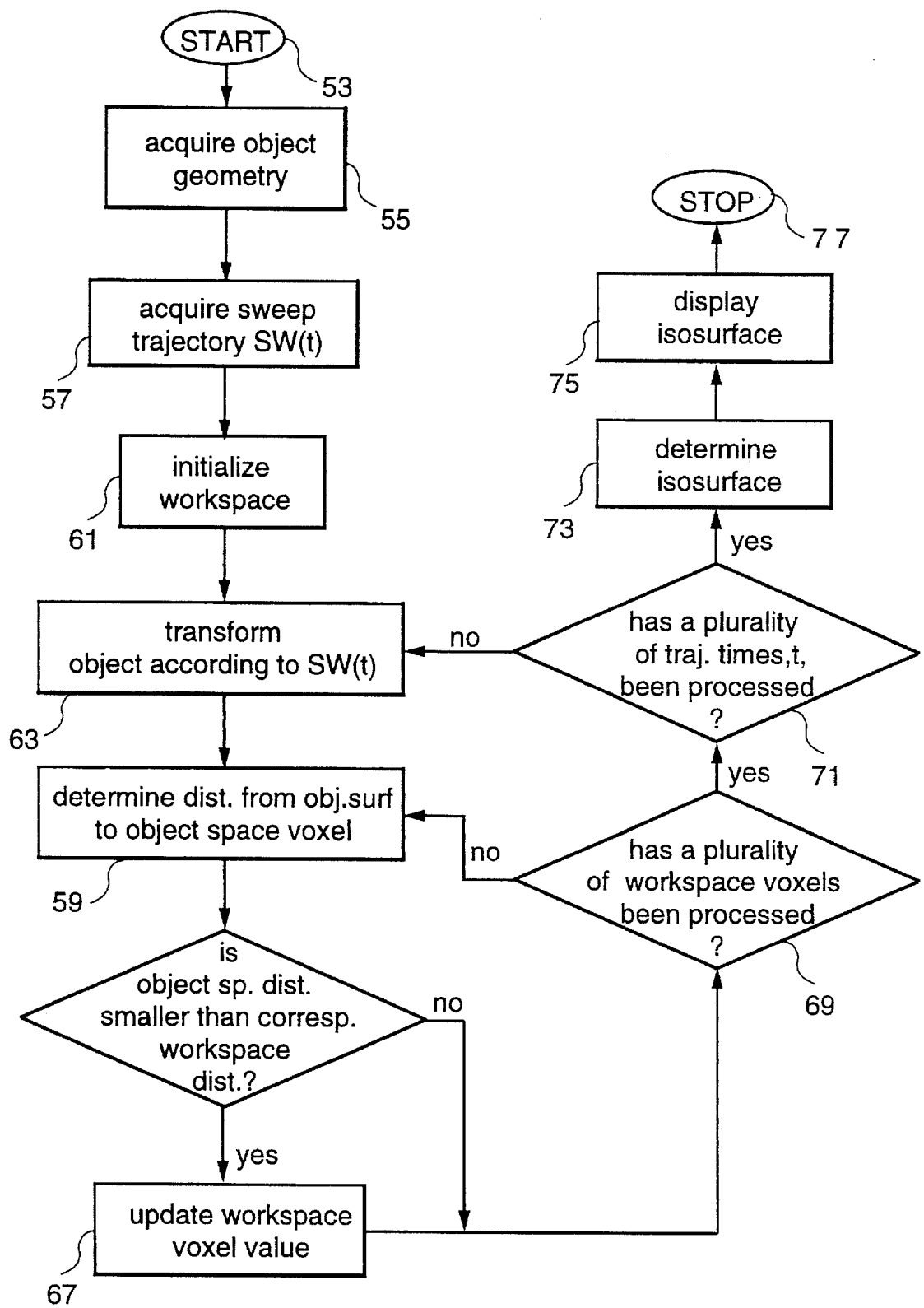
FIG. 5 is a simplified flow chart illustrating a method of generating swept surfaces according to the present invention.

In FIG. 5, the definition of an object to be swept and the sweep trajectory are provided to the system in blocks 55 and 57. A set of workspace distances assigned to workspace voxels, regularly spaced along a workspace coordinate system are initialized in block 61

In block 63, the object is transformed according to a sweep trajectory ST(T) at a time, t.

In block 59 a shortest distance is calculated from a workspace voxel to the object, and is repeated by step 69 for a plurality of workspace voxels. If the calculated distance is shorter than a stored, or running, distance, the stored distance is replaced by the calculated distance in block 67.

This is repeated for a plurality of time instants, t, by step 69, thereby accumulating a running register of the closest each voxel comes to the object as the object moves through sweep trajectory ST(t).

In step 73 workspace voxels are defined which have workspace distances of a predetermined value. This creates an iso-surface having a clearance defined by the predetermined value.

This process continues for a desired number of workspace voxels in workspace buffer 37. After a desired number of workspace voxels have been compared and updated, trajectory calculation unit 40 provides the trajectory information for a next time, t. Transformation device then transforms the object according to the new trajectory information and the elements function as described above.

After a desired number of time periods have been processed, the resulting values in workspace buffer 37 are analyzed by a surface generator 41. Surface generator 41 may employ a number of different types of surface identification procedures but the preferred surface identification procedure is the "Marching Cubes" method references above. After an iso-surface has been identified by surface generator 41 from the values stored in workspace buffer 37, they are displayed on a display 43.

Figure 6:
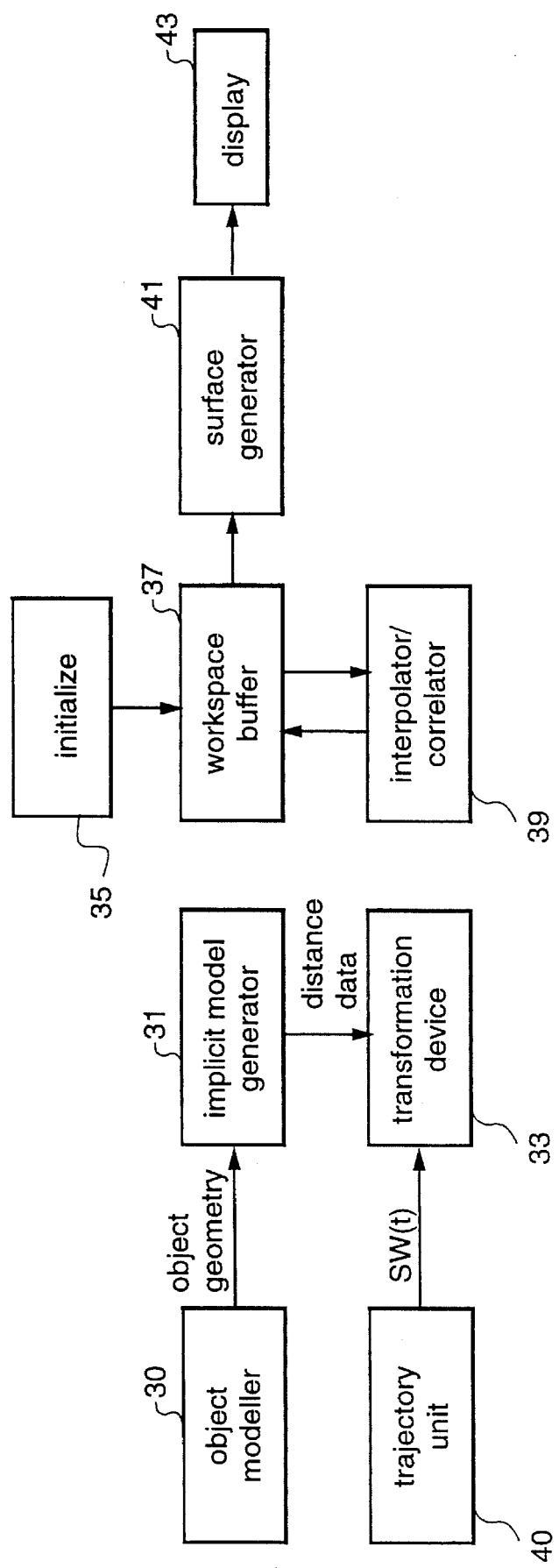
FIG. 6 is a simplified block diagram of a first embodiment of an apparatus for generating swept surfaces according to the present invention.

In FIG. 6, an apparatus capable of performing the method as outlined in FIG. 4, is illustrated in a simplified schematic block diagram. An object modeler 30 provides information about the object which is to be rotated and translated through a workspace is provided to an implicit model generator 31. Implicit model generator creates an N-dimensional block of data comprised of regularly spaced object voxels according to an implicit model spaced coordinate system each having a value associated with the voxel. Each value is the minimum distance from that voxel to the closest surface of the object. Block 40 at trajectory calculation unit provides a trajectory to transformation device 33. Transformation device 33 also receives the implicit model from implicit model generator 31 and transforms it according to the trajectory at a time, t. An initializer 35 initializes at the beginning of the process workspace buffer 37 which contains memory locations each corresponding to a volume element of the N-dimensional workspace volume. As before, the N-dimensional is replaced by three-dimensional for the remainder of this description, but the present invention applies equally to N-dimensional models. The implicit model space voxels now transform by transformation device 33 are provided to an interpolator comparator 39. Interpolator comparator 39 determines which implicit model space voxel corresponds most closely to a selected workspace voxel. The objects space voxel value assigned to the implicit model space voxel is interpolated to provide an interpolated value which is compared to the corresponding workspace voxel value in workspace buffer 37. If the interpolated voxel value is smaller than that stored in workspace buffer 37, it replaces the value in workspace buffer 37. Interpolator comparator 39 compares and interpolates a plurality of implicit model spaced voxels to corresponding workspace voxels and stores the interpolated value in workspace buffer 37 if it is lower than the current workspace voxel value. This process continues for a desired number of workspace voxels in workspace buffer 37. After a desired number of workspace voxels have been compared and updated, trajectory calculation unit 40 provides the trajectory information for a next time, t. Transformation device then transforms the implicit model according to the new trajectory information and interpolator/comparator 39 and workspace buffer 37 function as described before.

This process is repeated for as many time periods as desired. Each time trajectory information is provided from trajectory calculation unit 40, for a different time period, another position and orientation of the implicit model is processed to update the on-going workspace buffer voxel values in workspace buffer 37.

After a desired number of time periods have been processed, the resulting values in workspace buffer 37 are analyzed by a surface generator 41. Surface generator 41 may employ a number of different types of surface identification procedures but the preferred surface identification procedure is the "Marching Cubes" method references above. After an iso-surface has been identified by surface generator 41 from the values stored in workspace buffer 37, they are displayed on a display 43.

Figure 7:
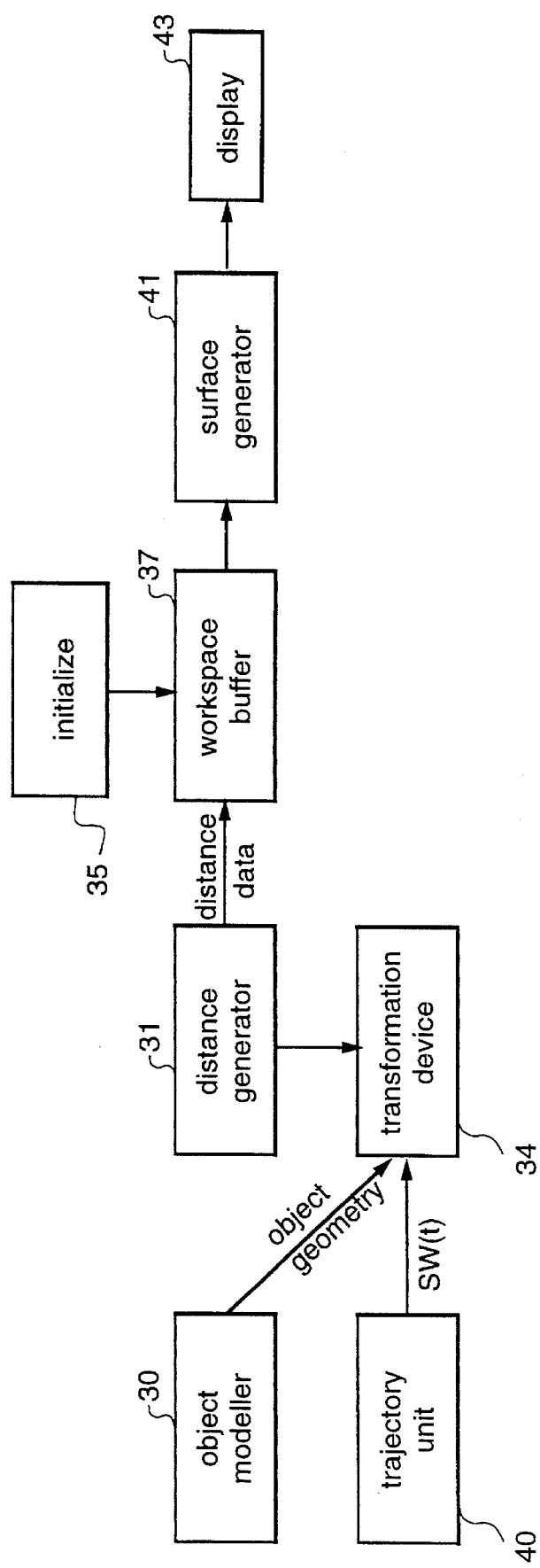
FIG. 7 is a simplified block diagram of a second embodiment of an apparatus for generating swept surfaces according to the present invention.
Figure 8:
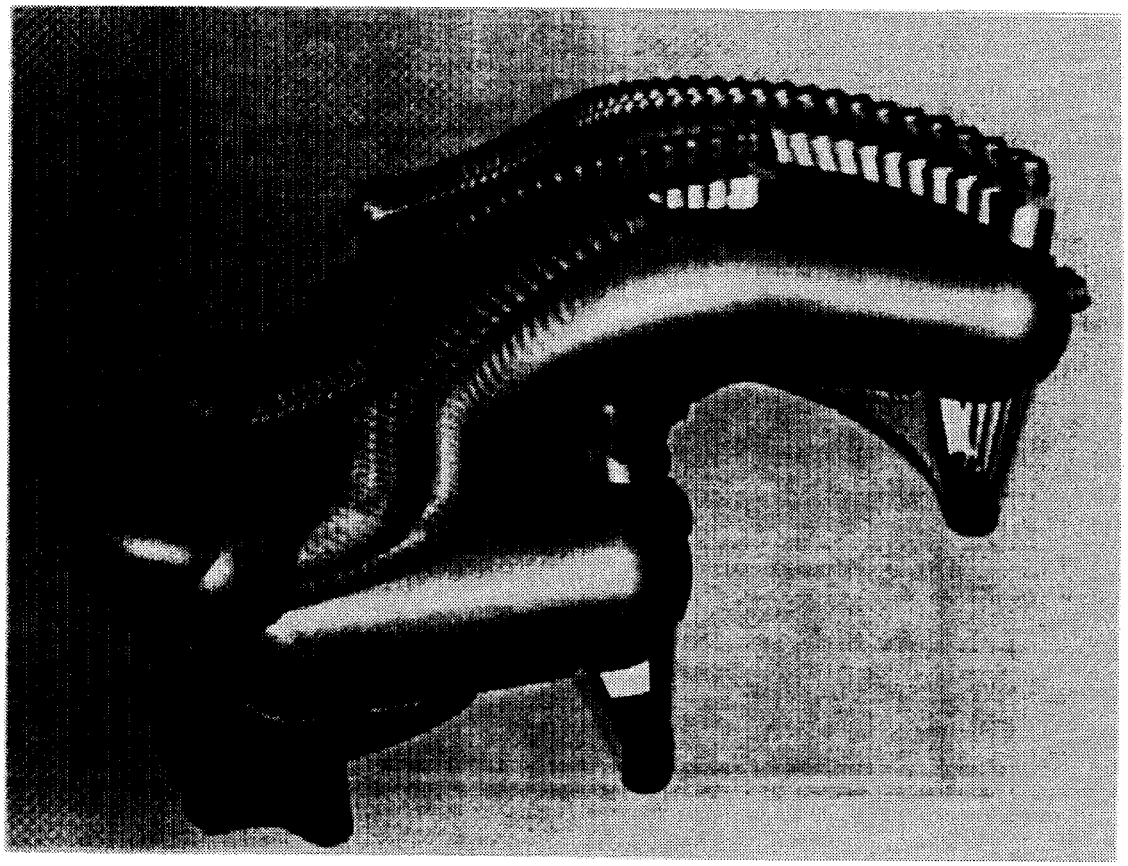
FIG. 8 is a multiple time-exposure sequence showing the motion of the object shown in FIG. 2 as it moves along sweep trajectory ST(t).

In FIG. 7, an apparatus capable of performing the method as outlined in FIG. 5, is illustrated in a simplified schematic block diagram.

An initializer 35 initializes a workspace buffer 37 at the beginning of the process. Workspace buffer 37 contains memory locations each corresponding to a volume element of the N-dimensional workspace volume. As before, the N-dimensional is replaced by three-dimensional for the remainder of this description, but the present invention applies equally to N-dimensional models.

An object modeler 30 provides information about the object which is to be rotated and translated through a workspace is provided to a transformation device 34. Trajectory unit 40 provides a sweep trajectory ST(t) to transformation device 34.

Transformation device 34 transforms it according to the trajectory at a time, t.

A distance generator 31 receives the transformed object and calculates distances from each workspace voxel to a closest point on the transformed object. This value is compared to the workspace distance stored in the workspace buffer. If the calculated value is shorter than the stored distance, the stored distance is replaced with the calculated distance.

This process continues for a desired number of workspace voxels in workspace buffer 37. After a desired number of workspace voxels have been compared and updated, trajectory calculation unit 40 provides the trajectory information for a next time, t. Transformation device then transforms the object according to the new trajectory information and the elements function as described above.

After a desired number of time periods have been processed, the resulting values in workspace buffer 37 are analyzed by a surface generator 41. Surface generator 41 may employ a number of different types of surface identification procedures but the preferred surface identification procedure is the "Marching Cubes" method references above. After an iso-surface has been identified by surface generator 41 from the values stored in workspace buffer 37, they are displayed on a display 43.

Multiple Surface Generation

More that one connected swept surface may be created for certain combinations of geometry and iso-surface value d. As described previously if f(p)>0 for all points p, both an inner an outer surface may be generated. If the geometric model is non-convex, then multiple inside and outside surfaces may be created. There will be at least one connected outer surface, however, that will bound all other surfaces. In some applications such as spatial planning and maintainability design this result is acceptable. Other applications require a single surface.

One remedy that works in many cases is to compute a signed distance function f() where values less than zero occur inside the object. This approach will eliminate any inner surfaces when d>0. Generally this requires some form of inside/outside test which may be expensive for some geometric representations. Another approach to extract the single bounding surface is to use a modified form of ray casting in combination with a surface connectivity algorithm.

The initial application for the present invention was for maintainability design. In this application the swept surface is called a removal envelope. The removal envelope is graphically describes to other designers the inviolable space required for part access and removal.

Fuel/Oil Heat Exchanger

Figure 9:
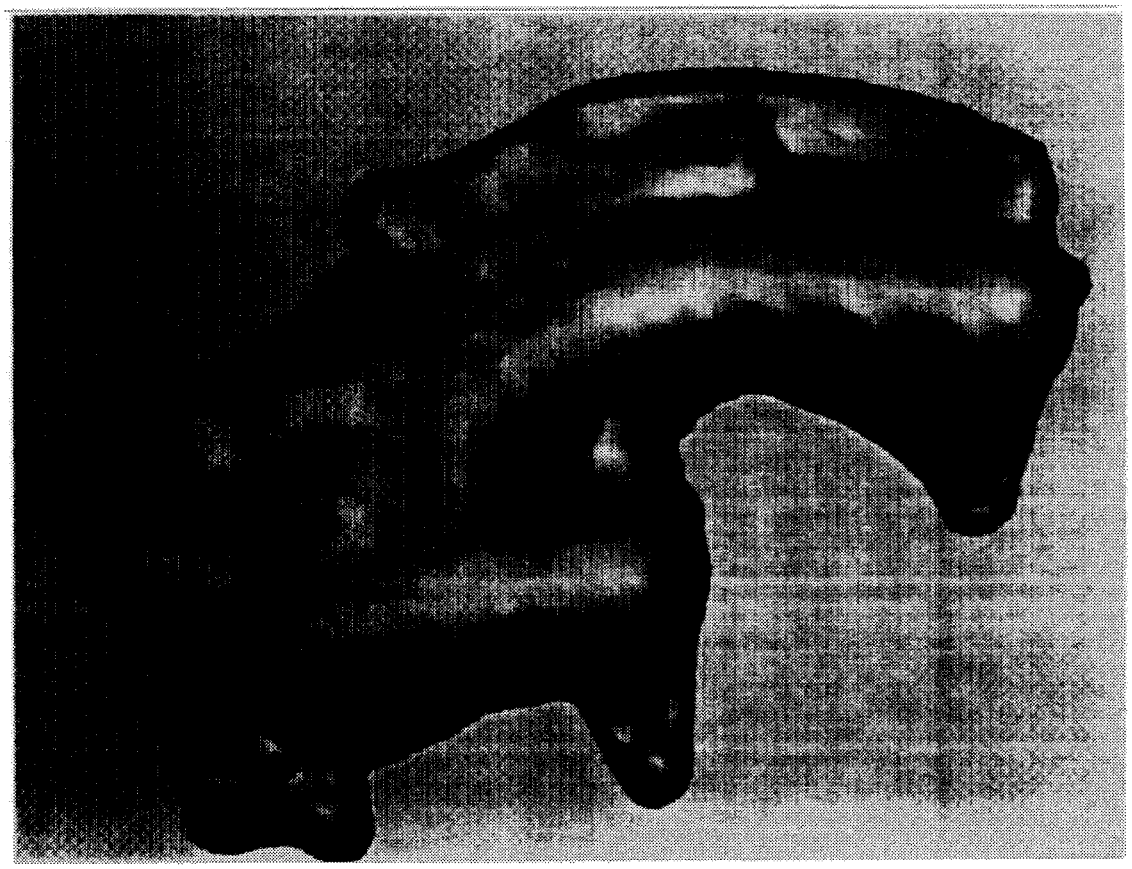
FIG. 9 shows the swept surface generated when the fuel/oil heat exchanger of FIG. 2 as it is moved along sweep trajectory ST(t).
Figure 10:
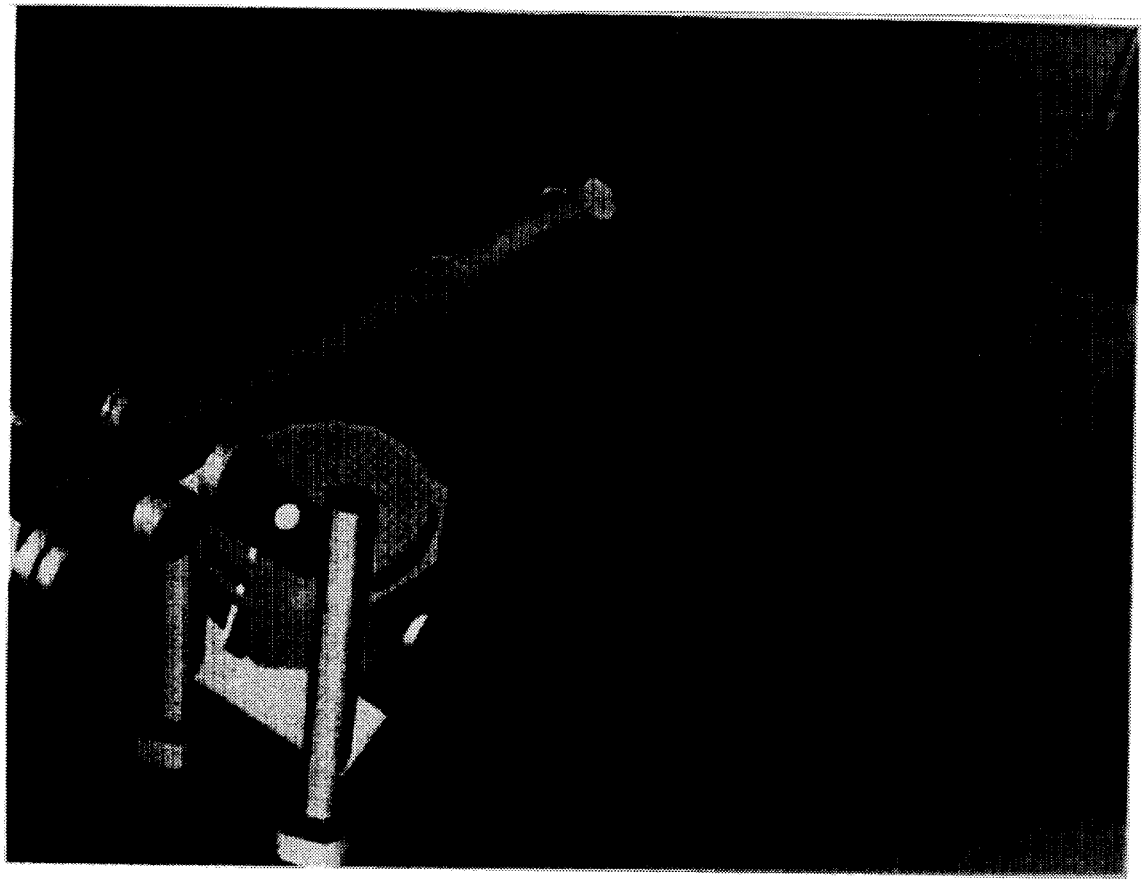
FIG. 10 is the swept surface of the motion of an end effectuator of a robot.

The part shown in FIG. 2 is a fuel/oil heat exchanger used in an aircraft engine. Maintenance requirements dictate that it must be able to be replaced within 30 minutes while the aircraft is at the gate. The removal path is shown in FIG. 10. FIG. 11 shows the swept surface of the pan. Both the implicit model and the workspace volume were generated at a resolution of $100^3$. The sweep trajectory contained 270 steps. The swept surface, generated with an offset of d=0.2 inch, consists of 15,108 triangles shown in FIG. 9.

Robot Motion

The present invention may also be employed in visualizing robot motion. In FIG. 10 the swept surfaces of a volume traversed by an end effectuator of a robot is shown. The end effectuator was sampled with $50^3$ samples. The workspace volume was sampled with $100^3$ samples. A distance value d=1 inch was used over a workspace volume size $V_W$= 140 inches.

Reduction to Practice

This invention has been implemented with GE Corp. Research and Development object-oriented software development system, LYMB.

While only certain preferred features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. A method of determining a swept surface of an object comprising the steps of:

a) acquiring information defining the geometry of said object;

b) acquiring a sweep trajectory ST(t) defining the motion of said object over time, t, relative to a workspace coordinate system;

c) defining an implicit model volume $V_I$, encompassing said object having volume elements, "model space voxels" between regularly spaced model space vertices each having a location defined according to an implicit model space coordinate system;

d) creating an implicit model by determining for each model space vertex, a model distance being a shortest distance from a surface of the object to the model space vertex and assigning each distance to its corresponding model space vertex;

e) defining a workspace volume $V_W$, at least as large as the implicit model volume $V_I$ having volume elements, "workspace voxels" between regularly spaced workspace vertices each having a location defined according to a workspace coordinate system;

f) initializing the workspace volume by assigning a predetermined initial distance value to each workspace vertex;

g) moving the implicit model volume $V_I$ relative to the workspace volume $V_W$ according to the sweep trajectory ST(t) for time, t;

h) selecting a workspace vertex which is located within a model space voxel;

i) interpolating a value for the selected workspace vertex from the model space vertices for this model space voxel and their assigned distances;

j) replacing the assigned workspace distance of the selected workspace vertex if the interpolated value is lower than the assigned workspace distance of the workspace voxel;

k) repeating steps 'i' and 'j' for a plurality of workspace vertices falling within model space voxels;

l) repeating steps 'g'–'k' for a plurality of sweep trajectory times, t;

m) defining an iso-surface comprised of workspace voxels having vertices with an assigned value being equal to a same predetermined value; and n) displaying selected portions of the iso-surface representing a boundary of a swept volume.

2. A method of determining a swept surface of an object comprising the steps of:

a) acquiring information defining the geometry of said object;

b) acquiring a sweep trajectory ST(t) defining the motion of said object over time, t relative to a workspace coordinate system;

c) defining a workspace volume $V_W$, at least as large as the object having volume elements, "workspace voxels" between regularly spaced workspace vertices each having a location defined according to a workspace coordinate system;

d) initializing the workspace volume by assigning a predetermined initial distance value to each workspace vertex;

e) transforming the object relative to the workspace volume $V_W$ according to the sweep trajectory ST(t), for time t;

f) calculating for each workspace vertex, a distance for time instant, t, being a shortest distance from a surface of the object to the model space voxel for that time instant;

g) replacing the assigned workspace distance of each workspace vertex if the calculated distance for time instant, t, is shorter than the assigned workspace distance;

h) repeating steps 'e'–'g' for a plurality of sweep trajectory times, t;

i) defining an iso-surface comprised of workspace voxels having vertices with an assigned value being equal to a same predetermined value; and j) displaying selected portions of the iso-surface representing a boundary of a swept volume.

3. An apparatus for calculating and displaying a swept surface from given object and sweep trajectory ST(t) definitions defining an object and its motion, comprising:

a) an implicit model generator for receiving said object definition and for creating an implicit model by defining a model space volume encompassing said object, the model space volume having model space voxels between regularly spaced model space vertices each having a location defined according to a model space coordinate system, and for calculating a distance assigned to each model space vertex being the shortest distance from the model space vertex to the object;

b) a workspace buffer for storing distance values pertaining to a plurality of regularly spaced workspace vertices of a workspace volume with a plurality workspace voxels defined between the regularly spaced workspace vertices located along a workspace coordinate system;

c) transformation device for receiving a sweep trajectory ST(t), which varies with time, t, for moving the implicit model with respect to the workspace according to said sweep trajectory ST(t) for a plurality of times, t, and for determining workspace vertices which are located within a model space voxel;

d) interpolator/correlator for interpolating distance values for a plurality of workspace vertices located within a model space voxel for a plurality of times, t, from the distance values of vertices of the model space voxel in which the workspace vertex is located and replacing the distance value currently assigned to the workspace vertex when the interpolated distance is smaller than the distance currently assigned to the workspace vertex;

e) display capable of displaying computer generated images; and f) surface generator that creates iso-surface from all workspace voxels having workspace vertices with a same predetermined distance value, and displays the iso-surface on the display.

4. The apparatus for calculating and displaying a swept surface of claim 3 further comprising an initializer coupled to the buffer, for assigning a predetermined initial distance value to all workspace vertices in the workspace buffer.

* * * * *